No. 724,393. PATENTED MAR. 31, 1903.
T. J. LINDSAY.
COMPENSATING GEAR.
APPLICATION FILED MAY 23, 1902.
NO MODEL.
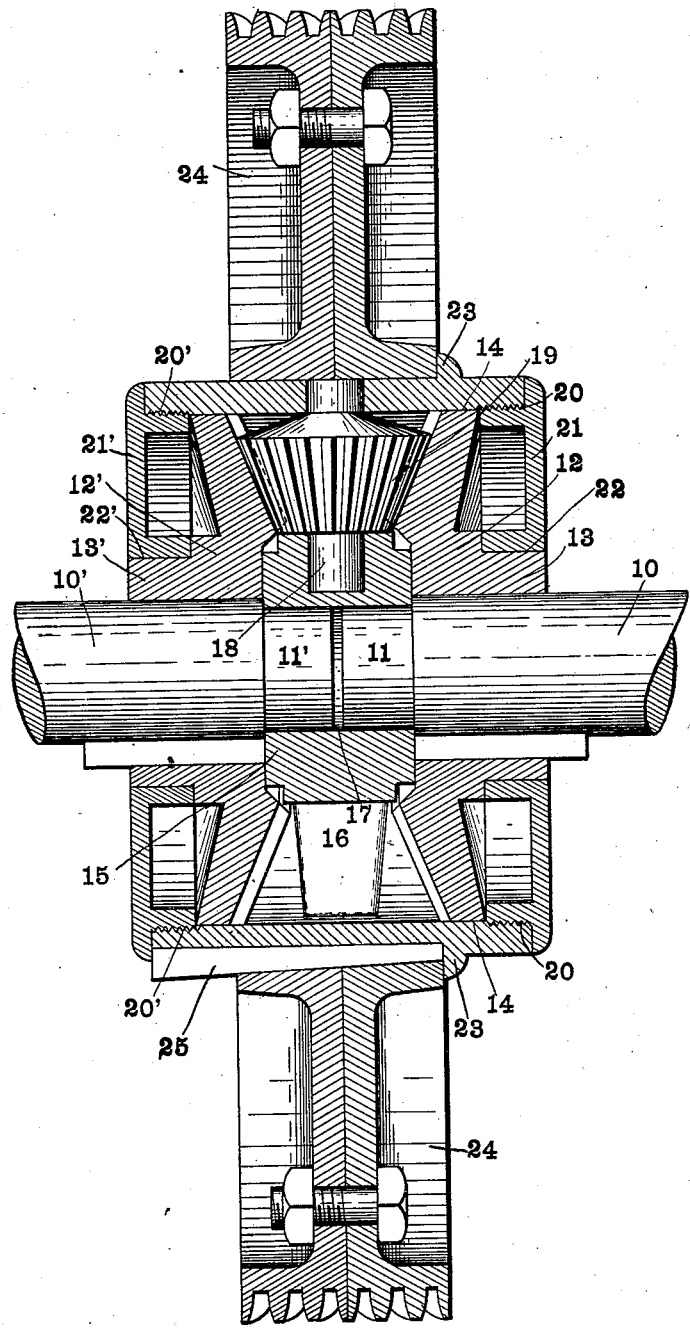
WITNESSES:
INVENTOR
Thomas J. Lindsay
BY
ATTORNEYS

UNITED STATES PATENT OFFICE.

THOMAS J. LINDSAY, OF INDIANAPOLIS, INDIANA.

COMPENSATING GEAR.

SPECIFICATION forming part of Letters Patent No. 724,393, dated March 31, 1903.

Application filed May 23, 1902. Serial No. 108,635. (No model.)

*To all whom it may concern:*

Be it known that I, THOMAS J. LINDSAY, a citizen of the United States, residing at Indianapolis, in the county of Marion and State of Indiana, have invented certain new and useful Improvements in Compensating Gear, of which the following is a specification.

My invention relates to that class of couplings by which two alined axles may be connected so as to be simultaneously driven, but connected in such manner as to allow necessary differential rotation of the two sections of the axle; and the object of my invention is to provide such improvements in details of construction as to produce an efficient, compact, and cheaply-manufactured gear.

The accompanying drawing, which is an axial section, illustrates my invention.

In the drawing, 10 and 10' indicate the two axle-sections, said axle-sections being provided at their abutting ends with reduced portions 11 and 11'. Keyed upon axle 10 is a bevel-gear 12, and keyed upon axle-section 10' is a similar bevel-gear 12', the two bevel-gears facing each other and being provided with reduced hub portions 13 and 13', respectively. The peripheries of the gears 12 and 12' fit within the bore of a hub 14, which carries a central sleeve 15, connected to the hub 14 by suitable arms 16. Sleeve 15 is provided with an axial bore 17, within which fit the adjacent reduced portions 11 and 11' of the axle-sections. Extending between the hub 14 and sleeve 15 is a bearing-pin 18, upon which is rotatably mounted a bevel-pinion 19, which lies within the annular space between the sleeve 15 and the hub 14 and meshes with the gears 12 and 12' in the usual well-known manner, the gear 19 being first arranged in position and the pin 18 being then slipped into position from the exterior of the hub 14. Hub 14 is internally threaded at 20 and 20', at its ends, and screwed into these threads are annular caps 21 and 21', respectively, said caps being each provided with an axial bore 22 and 22', respectively, adapted to snugly receive hubs 13 and 13', respectively, of the gears 12 and 12'. Hub 14 carries on its periphery to one side of its medial line a peripheral flange 23, against which the driving gear, pulley, or wheel 24 may be placed, said pulley, gear, or wheel being provided with an axial bore adapted to fit bore 14 and being keyed thereto by means of a key 25, which is equal in length to the distance between flange 23 and the opposing cap 21'. While in the drawing only one gear 19 has been shown, it will be readily understood that as many of said gears as may be desired may be used, three or four being the customary number, but the number being immaterial, so far as the present construction is concerned.

In assembling the parts gears 12 and 12' are keyed to their respective axle portions 10 and 10'. Gears 19 are then placed between hub 14 and the attached sleeve 15 and their pins 18 passed therethrough through the periphery of the hub 14 from opposite ends and brought into mesh with the gears 19. Cap 21 is then screwed into the threads 20, so as to bring gear 12 into mesh with the gears 19 and hold the same in position, the said cap at the same time forming a bearing for the reduced hub 13 of gear 12. The driving-gear 24 is then slipped upon the hub 14 and brought into engagement with the flange 23 thereof. Key 25 is then introduced and forced into position by means of the cap 21', which is screwed into the threads 20' of hub 14, the bore 22' fitting hub 13' of gear 12'.

I claim as my invention—

1. In a compensating gear, the combination, with a pair of axle-sections, of opposing gears carried thereby, a hub sleeved upon said gears, an intermediate gear carried by the hub and meshing with said gears, a pair of removable annular caps independently secured to the opposite ends of said hub and sleeved upon the first-mentioned gears, and a driving-wheel carried by the hub.

2. In a compensating gear, the combination, with a hollow hub 14, and an axially-bored sleeve 15 carried thereby, of a pin 18, a gear 19 arranged in the annular space between hub 14 and its sleeve 15 and revoluble upon said pin 18, a pair of gears 12 and 12' adapted to be secured to axle-sections and revoluble within the hub 14 and meshing with the gear 19, annular caps 21 and 21' screwed into opposite ends of the hub 14 and sleeved upon the gears 12 and 12', respectively, a driving-gear 24 sleeved upon hub 14 and lying over the outer end of the pin 18, and a key 25 connecting gear 24 with hub 14 and held in position by one of the annular caps, all substantially as and for the purposes set forth.

In witness whereof I have hereunto set my hand and seal, at Indianapolis, Indiana, this 20th day of May, A. D. 1902.

THOMAS J. LINDSAY. [L. S.]

Witnesses:
ARTHUR M. HOOD,
JAMES A. WALSH.